Feb. 18, 1969  D. M. DIETZ  3,428,531
DISTILLATION RECOVERY OF META-PHENYLENEDIAMINE
Filed June 1, 1967
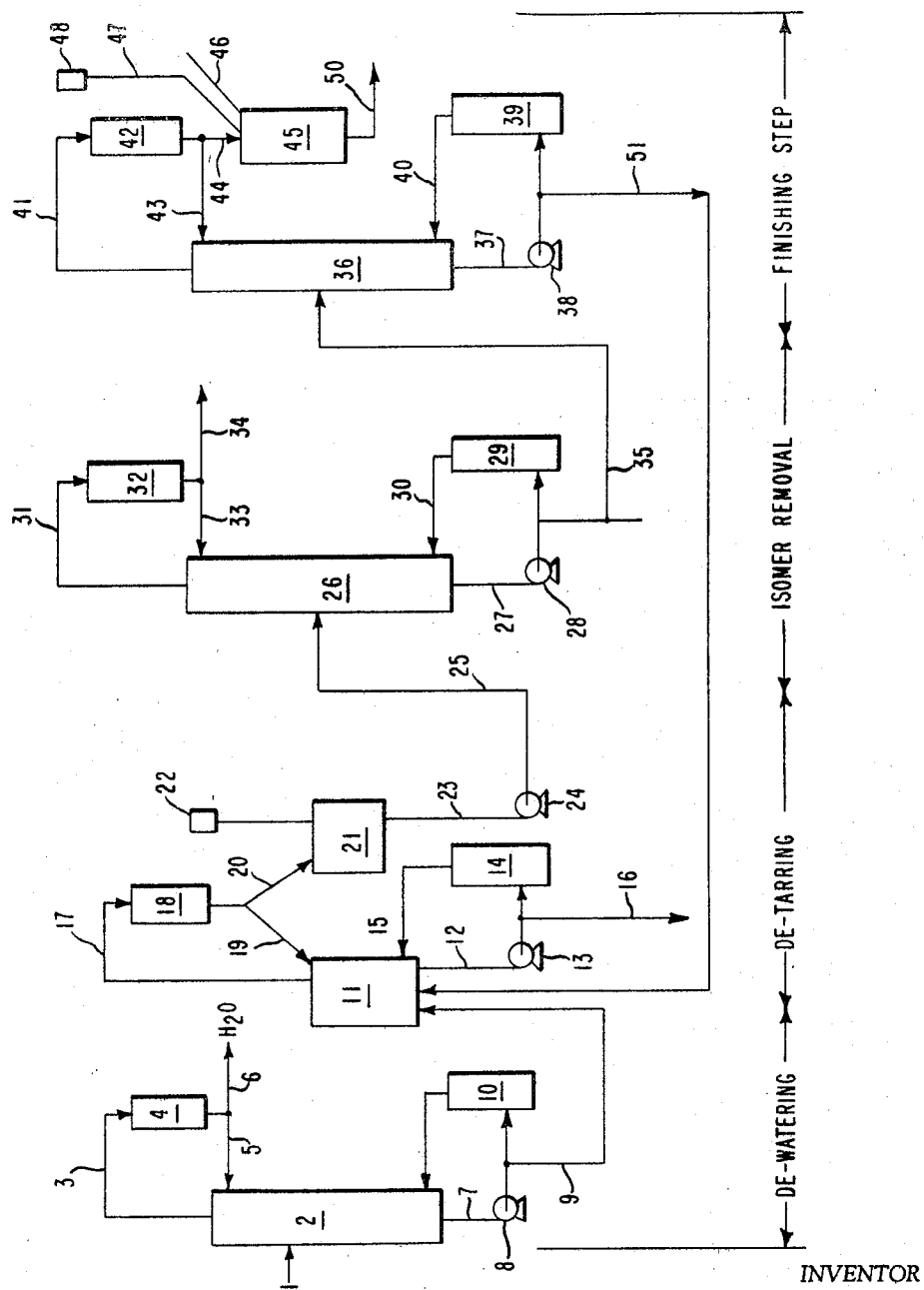
INVENTOR
DONALD M. DIETZ
BY *Thomas J. Hoffmann*
AGENT United States Patent Office 3,428,531
Patented Feb. 18, 1969

3,428,531
DISTILLATION RECOVERY OF
METAPHENYLENEDIAMINE
Donald Mars Dietz, Westhaven, Del., assignor to E. I.
du Pont de Nemours & Company, Wilmington, Del.,
a corporation of Delaware
Filed June 1, 1967, Ser. No. 642,815
U.S. Cl. 203—80                          1 Claim
Int. Cl. B01d 3/14, 3/10; C07c 85/16

ABSTRACT OF THE DISCLOSURE

A continuous process for the separation of meta-phenylenediamine from the ortho and para isomers and tars, by a series of distillations, at or above atmospheric pressure.

Background of the invention

Various methods have been disclosed for the separation of meta-phenylenediamine from its ortho and para isomers to obtain a product of high purity which is stable to light, heat and air. U.S. Patent 2,946,822 discloses a chromate anion treatment. This patent states that separation by distillation is not feasible commercially due to the close boiling points of the three isomers.

However, British Patent 966,812 discloses, among others, the separation of the ortho isomer from meta-phenylene-diamine by distillation in the presence of a boric acid, a boronic acid or an ester or anhydride of such acids. The distillation may be carried out at atmospheric pressure or under reduced pressure, distillation under reduced pressure being normally used when the amines have a very high boiling point or tend to decompose at high temperature.

Prior to the present invention, the distillation of meta-phenylenediamine was carried out at reduced pressures due to the fear that the metal-phenylenediamine would decompos if the distillation temperature were raised. U.S. Patent 3,203,994 discloses that m-phenylenediamine, when heated above its melting point, decomposes.

Contrary to the teaching of the prior art, it has been found that the diamine does not decompose at the higher temperatures employed when the distillation is run at atmospheric pressure. The novel method of the present invention also has the added advantage of stopping the in-leakage of air which is present when commercial vacuum equipment is used. This in-leakage takes place around the flange joints, which are difficult or impractical to completely seal. When there is no pressure differential across these joints, there is no leakage of air into the distillation column. It has also been found that the exclusion of air from the column lessens the decomposition of the diamine into tar and produces a product of greater stability. Air entrapped in the product porduced by the low pressure distillation method greatly increases discoloration during storage.

Another advantage is that atmospheric distillation increases the production rate because the vapor density within the column is greater than at reduced pressures. Thus a given column will deliver more of the desired distillates at atmospheric than at reduced pressures. Alternatively, a smaller diameter column can be used at atmospheric pressure to achieve the production rate of a reduced pressure distillation column. The resulting savings in investment exceed the somewhat higher cost of heating the feeds to the higher temperatures required for atmospheric distillations.

Summary of the invention

The seven steps which comprise the continuous process for the distillation and recovery of meta-phenylenediamine are as follows:

(1) Continuously feeding a composition comprising a major portion of m-phenylenediamine and minor portions of ortho-phenylenediamine and para-phenylenediamine to a separation distillation column equipped with a liquid reboiler and a vapor condenser and liquid receiver, (2) Maintaining the separation column at a pressure such that the pressure in the receiver is about 5 mm. Hg above atmospheric and in the reboiler is from about 100 to 500 mm. Hg greater than atmospheric, (3) Maintaining the liquid fraction in the reboiler at a temperature sufficient to produce a vapor fraction containing substantially all of the ortho- and para-phenylenediamine content and a liquid meta-phenylenediamine fraction which is substantially free of said ortho- and para-isomers and which contains a minor proportion of higher-boiling tars, (4) Continuously removing and feeding said substantially isomer-free, tar-containing meta-phenylenediamine liquid fraction to a finishing distillation column equipped with a liquid reboiler and a vapor condenser and liquid receiver, (5) Maintaining the finishing column at a pressure such that the receiver is at a pressure at least about 5 mm. Hg above atmospheric and the pressure in the reboiler is from about 10 to 100 mm. Hg greater than atmosphere, (6) Maintaining the liquid fraction in the reboiler at a temperature sufficient to produce a metal-phenylenediamine vapor fraction substantially isomer-free and tar-free, and (7) Recovering meta-phenylenediamine, substantially free of its isomers and tars from the vapor condenser and liquid receiver.

Brief description of the drawing

The figure is a flow sheet of the overall multistage binary splitting distillation train comprising the process of this invention. The train consists of a dewatering stage, a detarring stage, an isomer removal stage, and a finishing stage.

Description of the invention

Referring to the figure, an aqueous crude meta-phenylenediamine solution, such as the filtered product from the hydrogenation of technical meta-dinitrobenzene, is continuously fed through line 1 to the mid-region of dewatering column 2, equipped with condenser 4 and reboiler 10. Water continuously distills out through line 3 and condenses in condenser 4 from which it can be returned as reflux through line 5 or removed through line 6. Pump 8 circulates the column contents through exit line 7, reboiler 10, which provides heat for the distillation, and the return line. Water-free diamine, i.e., containing less than 1,000 p.p.m. H$_2$O, leaves the column as the bottoms stream through line 9 and passes to detarring column 11. The operating pressure for the dewatering distillation is from 10 to 50 mm. Hg above the actual atmospheric pressure at the base of the column where the liquid is heated for distillation. The temperature must be sufficient to vaporize the water component at the recited pressure. When the starting diamine composition is already water-free, but contains substantial quantities of tar, e.g., 0.3% or more, it is sent directly into line 9 for passage to column 11.

Line 9 carries the water-free diamine composition to detarring column 11. Line 9 stream may be combined with tar-containing line 51 stream from finishing column 36. Pump 13 circulates the column's liquid contents through lines 12 and 15 and reboiler 14 which supplies the heat required to vaporize the diamine and maintain the tar content fluid. Vaporized diamine passes through overhead line 17 to condenser 18 from which it can return as reflux through line 19 or pass through line 20 to receiver 21 where the substantially tar-free but isomer-containing meta-phenylenediamine is maintained under inert atmosphere, preferably at a pressure slightly greater than, atmospheric e.g., 5–15 mm. Hg gauge. Vapor release outlet 22 prevents air-in leakage by permitting vapor to pass outwards only.

The diamine is distilled out to the extent that the residual liquid portion remaining in the column is still sufficiently fluid for recycle through the reboiler and passage through line 16. Normally bottoms compositions containing as low as 5% diamine, the rest tar, are still desirably fluid at temperatures in the 280°–350° C. range.

As the diamine content of the tar decreases, the temperature required for distillation increases. To thus reduce the diamine content in the tar to less than 20% requires relatively high temperatures when distilling against normal atmosphere. When heating means for attaining such temperatures are not available, the pressure within the system will have to be reduced to permit lower temperature operation. Tar formation will increase, however, to the extent that the reduced pressure within the distillation zone draws air into the system through leaks. When reduced pressure operation is necessary, the highest practical pressure is maintained in the detarring system.

The isomer-containing dewatered and detarred metadiamine passing from tank 21 through line 23 is continuously pumped by pump 24 through line 25 into the mid-region of isomer separation column 26. Reboiler 29 provides heat for column 26 by heating the liquid fraction which pump 28 pumps through it and lines 27 and 30. Column 26 is maintained at super atmospheric pressure and at a temperature sufficient to vaporize the ortho-phenylenediamine, normal B.P. 255° C., and the para-phenylenediamine, normal B.P. 267° C., substantially completely from the higher-boiling meta-phenylenediamine, normal B.P. 283° C. The operating pressure at the base of the column may vary from 100 to 500 mm. Hg above that of the surrounding atmosphere. The reboiler temperature may vary broadly from 285° to 320° C. depending on the column and its pressure drop. The vaporized fraction passes through line 31 to condenser 32 from which a portion is returned as reflux via line 33 to the column, or removed through recovery line 34.

The higher-boiling liquid fraction is continuously removed from column 26 through line 35. This material, though substantially isomer-free, i.e., containing less than 300 p.p.m. of each isomer, now contains a small amount (e.g., 0.1–0.3%) of high-boiling tar formed during its residency in column 26. It is accordingly sent to finishing column 36 for final detarring.

The line 35 stream is passed to the mid-region of finishing column 36 where it is fractionated into a tar-free meta-diamine vapor fraction and a tar-containing liquid bottoms fraction. Pump 38 circulates the liquid phase through line 37, reboiler 39 and return line 40. The vapor fraction passes through line 41 to condenser 42. A portion returns to the column as reflux through line 43; the rest collects in receiver 45 maintained under inert atmosphere, e.g., nitrogen, argon, etc., at a pressure slightly exceeding atmospheric. The inert atmosphere is fed through line 46 while vapor release line 47 and pressure vent 48 permit out flow only. The liquid bottoms stream, which contains substantially all the tar fed to the finishing column and any additional tar formed therein by thermal decomposition of the diamine feed, leaves through line 51 and passes to column 11 for detarring. The operating pressure for the finishing column may range broadly from 5 to 100 mm. Hg above the surrounding atmosphere with temperatures ranging from about 285° to 320° C. depending on the pressure differential in the column.

The recovered meta-phenylenediamine in receiver 45 is substantially colorless when molten, white when crystalline, and is substantially free of water, air-contamination, isomers and high-boiling decomposition products. Stored in the absence of air, it remains substantially unchanged indefinitely.

EXAMPLE

A distillation train as shown in the figure was used in the following example. The columns are of carbon steel. Before startup, the entire system is flushed with dry nitrogen and the overhead diamine receivers are maintained under a positive nitrogen pressure of 10 to 15 mm. of Hg to exclude air. The flow rates described are steady-state values.

A dewatering stage feed composition containing by weight

| | Percent |
|---|---|
| m-Phenylenediamine | 49.19 |
| o-Phenylenediamine | 6.00 |
| p-Phenylenediamine | 1.57 |
| Dinitrobenzene | .14 |
| Tar | .57 |
| Water | 42.54 | and preheated to 105° C. was fed at a rate of 100 lbs./hr. to a distillation column having 3 theoretical plates at total reflux, the feed point being at theoretical plate 1.7 from the bottom.

A water vapor fraction was distilled out at atmospheric pressure. This distillate contained less than about 0.1% diamine and amounted to about 42.6 lbs. of distillate per hour.

The liquid fraction is maintained at 285° to 290° C. by circulating through the reboiler. Due to the normal pressure differential within the column, the pressure at the base of the column was about 770 mm. of Hg. The bottom stream was removed at a rate of 57.4 lbs. of liquid fraction per hour. The composition of the bottoms stream was

| | Percent |
|---|---|
| Meta-isomer | 85.55 |
| Ortho-isomer | 10.17 |
| Para-isomer | 2.59 |
| Dinitrobenzene | .18 |
| Water | .005 |
| Tar | 1.50 |

The entire bottoms stream from the dewatering stage constitutes the feed stream to the detarring stage. The detarring distillation column contains one theoretical plate at total reflux and is adjusted for distillation at 450 mm. Hg. Simultaneously there was also fed to this column 0.5 lb./hr. of an 80% diamine–20% tar stream from the bottom of the final finishing column described below.

The vapor fraction boiled at 250° C. and was removed at a rate of 55.3 lbs. of distillate per hour. The vapor fraction composition was

| | Percent |
|---|---|
| m-Phenylenediamine | 88.61 |
| o-Phenylenediamine | 9.29 |
| p-Phenylenediamine | 2.10 |
| Water | .005 |

The liquid fraction is maintained at 295° to 300° C. by circulation through the reboiler. The bottoms stream composed of about 80% tar, 16% diamine and 4% dinitrobenzene is removed at a rate of 2.6 lbs. per hour.

Under the above reduced pressure conditions, air leaked into the detarring still at the rate of about 1 lb. of air per hour. This corresponds to about 0.2 lb. of oxygen per hour which is 0.3% by weight of the diamine fed. The amount of tar removed from the detarring still was about twice the total amount fed. This increase in tar is attributed largely to the degradative effect of the oxygen contaminant during the distillation.

The hot, tar-free phenylenediamine distillate from the detarring column is fed directly to isomer removal stage. This feed of 55.3 lbs. of distillate per hour was fed to a fractionating column that contains 43 theoretical stages at total reflux, with the feedinlet at the 29.8 theoretical plate from the bottom. The column was at a positive (nitrogen) pressure such that the pressure was 785 mm. Hg. in the overhead takeoff line, which resulted in a pressure of 1,000 mm. Hg. in the reboiler.

The vapor fraction boiled at 259° C. at 785 mm. of Hg. and was composed of

| | Percent |
|---|---|
| m-Phenylenediamine | 0.10 |
| o-Phenylenediamine | 80.90 |
| p-Phenylenediamine | 19.00 |

The distillate also contained all the residual water from the column so that the undistilled fraction was essentially water-free. The vapor fraction was condensed and removed at a rate of 6.3 lbs. per hour.

The bottom fraction, which was heated in the reboiler to 297° to 300° C. was taken off at a rate of 49 lbs. per hour. This meta-phenylenediamine stream had a freezing point of 60° C. and contained no ortho-isomer, 50 p.p.m. para-isomer, no water and 0.2% tar. The bottoms stream was then fed at the rate of 49 lbs. per hour to the finishing stage.

The finishing distillation contained one theoretical plate at total reflux. The column was maintained at a positive (nitrogen) pressure such that during distillation the pressure in the overhead takeoff line was 785 mm. Hg. Meta-phenylenediamine distillate was collected at the rate of 48.5 lbs. per hour. The freezing point of the distillate was 63° C. and it contained no ortho-isomer, no tar, no water and about 50 p.p.m. para-isomer. Conveniently the receiver is maintained at a temperature of 85° C. so that molten product can be readily transported under inert atmosphere to other facilities for packaging or reaction.

Simultaneously the liquid fraction in the column, heated to 290° C. in the reboiler, was continuously taken off at the rate of 0.5 lb./hr. The liquid stream which was about 80% meta-diamine and the remainder tar, was sent to the second column of the distillation train, that is, the detarring column described above, thus completing the overall distillation process.

The molten meta-phenylenediamine described above was continuously pumped to a flaker, comprising an internally cooled rotating drum and a doctor blade, maintained in a dry nitrogen atmosphere. The diamine, which solidified on the drum surface, was scraped off as flakes, which feed by gravity into fiber storage drums. Product in these drums stored under ordinary atmospheric conditions, remained substantially white for at least two months.

It is to be understood that the preceding examples are representative and that said examples may be varied within the scope of the total specification, as understood by one skilled in the art, to produce essentially the same results.

As many widely different embodiments of this invention may be made without departing from the spirit and scope thereof, it is to be understood that this invention is not limited to the specific embodiments thereof, except as defined in the appended claims.

The embodiments of the invention in which an exclusive property or privilege is claimed as defined as follows:

I claim:
1. The continuous process for the distillation and recovery of meta-phenylenediamine which comprises:
   (a) continuously feeding a composition comprising a major portion of m-phenylenediamine and minor portions of ortho-phenylenediamine and para-phenylenediamine to a separation distillation column equipped with a liquid reboiler and a vapor condenser and liquid receiver,
   (b) maintaining the separation column at a pressure such that the pressure in the receiver is from about 5 mm. Hg above atmospheric and in the reboiler is from about 100 to 500 mm. Hg greater than atmospheric,
   (c) maintaining the liquid fraction in the reboiler at a temperature sufficient to produce a vapor fraction containing substantially all of the ortho- and para-phenylenediamine content and a liquid meta-phenylenediamine fraction which is substantially free of said ortho- and para-isomers and which contains a minor proportion of higher-boiling tars formed during this stage,
   (d) continuously removing and feeding said substantially isomer-free, tar-containing meta-phenylenediamine liquid fraction to a finishing distillation column equipped with a liquid reboiler and a vapor condenser and liquid receiver,
   (e) maintaining the finishing column at a pressure such that the receiver is at a pressure at least about 5 mm. Hg above atmospheric and the pressure in the reboiler is from about 10 to 100 mm. Hg greater than atmosphere,
   (f) maintaining the liquid fraction in the reboiler at a temperature sufficient to produce a meta-phenylenediamine vapor fraction substantially water-free, isomer-free and tar-free, and
   (g) recovering meta-phenylenediamine, substantially free of its isomers and tars from the vapor condenser and liquid receiver.

References Cited

UNITED STATES PATENTS

| 1,918,997 | 7/1933 | Weiland | 260—582 |
| 2,385,504 | 9/1945 | Goulding | 260—582 |
| 3,270,058 | 8/1966 | Sutcliffe | 260—582 |

FOREIGN PATENTS

| 966,812 | 8/1964 | Great Britain. |

WILBUR L. BASCOMB, JR., *Primary Examiner.*

U.S. Cl. X.R.

203—84, 71; 260—582